US007908373B2

(12) United States Patent
Okada

(10) Patent No.: US 7,908,373 B2
(45) Date of Patent: Mar. 15, 2011

(54) MULTIFUNCTION TERMINAL, OPERATING INFORMATION ESTIMATION APPARATUS, AND OPERATING INFORMATION ESTIMATION METHOD

(75) Inventor: Takanao Okada, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1535 days.

(21) Appl. No.: 11/264,315

(22) Filed: Oct. 31, 2005

(65) Prior Publication Data

US 2006/0159036 A1 Jul. 20, 2006

(30) Foreign Application Priority Data

Jan. 17, 2005 (JP) ................................ 2005-008613

(51) Int. Cl.
*G06F 15/173* (2006.01)

(52) U.S. Cl. ........................................ 709/226; 709/220

(58) Field of Classification Search ............ 358/1.1–1.6, 358/1.11–1.18; 709/203, 217–221, 223–228
See application file for complete search history.

(56) References Cited

U.S. PATENT DOCUMENTS

| | | | | |
|---|---|---|---|---|
| 6,195,172 | B1 * | 2/2001 | Minamizawa | 358/1.15 |
| 6,871,243 | B2 * | 3/2005 | Iwase et al. | 710/62 |
| 6,912,071 | B1 * | 6/2005 | Rasmussen et al. | 358/406 |
| 7,164,351 | B2 * | 1/2007 | Matsumae et al. | 358/1.14 |
| 7,380,121 | B2 * | 5/2008 | Nomura et al. | 713/166 |
| 7,515,299 | B2 * | 4/2009 | Asano | 358/1.9 |
| 2004/0100650 | A1 * | 5/2004 | Landau et al. | 358/1.14 |
| 2006/0178917 | A1 * | 8/2006 | Merriam et al. | 705/7 |

FOREIGN PATENT DOCUMENTS

| | | |
|---|---|---|
| JP | 09186811 | 7/1997 |
| JP | 2002-166631 | 6/2002 |
| JP | 2004094943 | 3/2004 |

* cited by examiner

*Primary Examiner* — Faruk Hamza

(74) *Attorney, Agent, or Firm* — Patterson & Sheridan, LLP

(57) ABSTRACT

A multifunction terminal that transmits information to an operating information estimation apparatus is provided. The operating information estimation apparatus estimates operating information relating to an execution state of functions provided in the multifunction terminal based on the transmitted information. The multifunction terminal includes a requested information acquisition section that acquires requested information relating to requirements of a user for the multifunction terminal. The multifunctional terminal also has a requested information transmission section that transmits the requested information to the operating information estimation apparatus. The requested information relates to functions that the user expects the multifunction terminal to provide.

7 Claims, 8 Drawing Sheets

FIG. 5

| VARIABLE | Y | X 1 | X 2 | X 3 | X 4 | X 5 | X 6 |
|---|---|---|---|---|---|---|---|
| SHOP | COLOR PRINT COUNT/MONTH | ACCESS NUMBER /DAY | STUDENT NUMBER | POPULATION | COMPETING SHOP NUMBER | BUSINESS SATELLITE NUMBER (WITH 100 OR MORE EMPLOYEES) | BUSINESS SATELLITE NUMBER (WITH LESS THAN 100 EMPLOYEES) |
| A | 488 | 499 | 0 | 3000 | 2 | 2 | 10 |
| B | 387 | 2188 | 1098 | 200 | 0 | 1 | 2 |
| C | 1233 | 188 | 58 | 900 | 2 | 1 | 3 |
| D | 2889 | 1787 | 2300 | 20 | 3 | 2 | 1 |
| ⋮ | ⋮ | ⋮ | ⋮ | ⋮ | ⋮ | ⋮ | ⋮ |
| T | 3002 | 2003 | 3290 | 320 | 2 | 2 | 4 |

| ACCESS NUMBER/DAY | STUDENT NUMBER | POPULATION | COMPETING SHOP NUMBER | BUSINESS SATELLITE NUMBER (WITH 100 OR MORE EMPLOYEES) | BUSINESS SATELLITE NUMBER (WITH LESS THAN 100 EMPLOYEES) |
|---|---|---|---|---|---|
| 548 | 3786 | 502 | 3 | 1 | 3 |

| FUNCTION | BLACK-AND-WHITE PRINT | COLOR PRINT | BLACK-AND-WHITE COPY | COLOR COPY | SCANNER | FAX |
|---|---|---|---|---|---|---|
| COUNT | 1900 | 1567 | 789 | 676 | 299 | 36 |

MULTIFUNCTION TERMINAL, OPERATING INFORMATION ESTIMATION APPARATUS, AND OPERATING INFORMATION ESTIMATION METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to a technique of estimating operating information relating to an execution state of functions provided in a multifunction terminal.

2. Description of the Related Art

Conventionally, a technique that automatically makes setting of an image forming apparatus in accordance with its use environment to improve the usability has been proposed (refer to, for example, Jpn. Pat. Appln. Laid-Open Publications No. 2002-166631 and No. 2001-305814).

In recent years, a multifunction terminal such as an MFP (Multi-Function Peripheral) or an MMK (Multimedia Kiosk) is used to provide a service to an unspecified number of users. However, a user group that utilizes the service differs in character depending on the installation location of the multifunction terminal and, accordingly, functions that the user expects the multifunction terminal to provide differs depending on the installation location of the terminal. Therefore, if the function of the multifunction terminal is suitably selected depending on the installation location (installation environment) of the multifunctional terminal, a provider can effectively provide services to users and, at the same time, the users can effectively receive services. However, in the case where the multifunction terminals are installed in CVSs (CONVENIENCE STORES) and GMSs (General Merchandise store) for an unspecified number of users, it is difficult to grasp user's needs since wide variety of user groups exist.

Further, the prior art is a technique that automatically makes setting of the terminal in accordance with its use environment and, therefore, cannot grasp functions that the user expects the terminal to provide.

The present invention has been made to solve the above problem, and an object there of is to provide a technique for estimating functions that user expects a multifunction terminal at some installation location to provide.

To solve the above problem, according to a first aspect of the present invention, there is provided a multifunction terminal that transmits predetermined information to an operating information estimation apparatus that estimates operating information relating to an execution state of functions provided in the multifunction terminal based on information received from the multifunction terminal, comprising: a requested information acquisition section that acquires requested information relating to requirements of a user for the multifunction terminal; and a requested information transmission section that transmits the requested information acquired by the requested information acquisition section to the operating information estimation apparatus at a first predetermined timing.

According to a second aspect of the present invention, there is provided an operating information estimation apparatus comprising: an environment information acquisition section that acquires environment information relating to an installation location of a multifunction terminal; an operating information acquisition section that acquires operating information relating to an execution state of functions provided in the multifunction terminal; an analysis section that performs regression analysis with the environment information acquired by the environment information acquisition section set as an explanatory variable and the operating information acquired by the operating information acquisition section set as a criterion variable; and an operating information estimation section that estimates the operating information corresponding to given environment information based on a result of the analysis made by the analysis section.

According to a third aspect of the present invention, there is provided an operating information estimation method comprising: an operating information acquisition step that acquires operating information relating to an execution state of functions provided in a multifunction terminal; an environment information acquisition step that acquires environment information relating to an installation location of the multifunction terminal; an analysis step that performs regression analysis with the environment information acquired in the environment information acquisition step set as an explanatory variable and the operating information acquired in the operating information acquisition step set as a criterion variable; and an operating information estimation step that estimates the operating information corresponding to given environment information based on a result of the analysis made by the analysis section.

DESCRIPTION OF THE DRAWINGS

FIG. 5 is a view showing an example of the contents of environment information (market data) stored in a database.

DETAILED DESCRIPTION OF THE INVENTION

An embodiment of the present invention will be described below with reference to the accompanying drawings.

Figure 1:
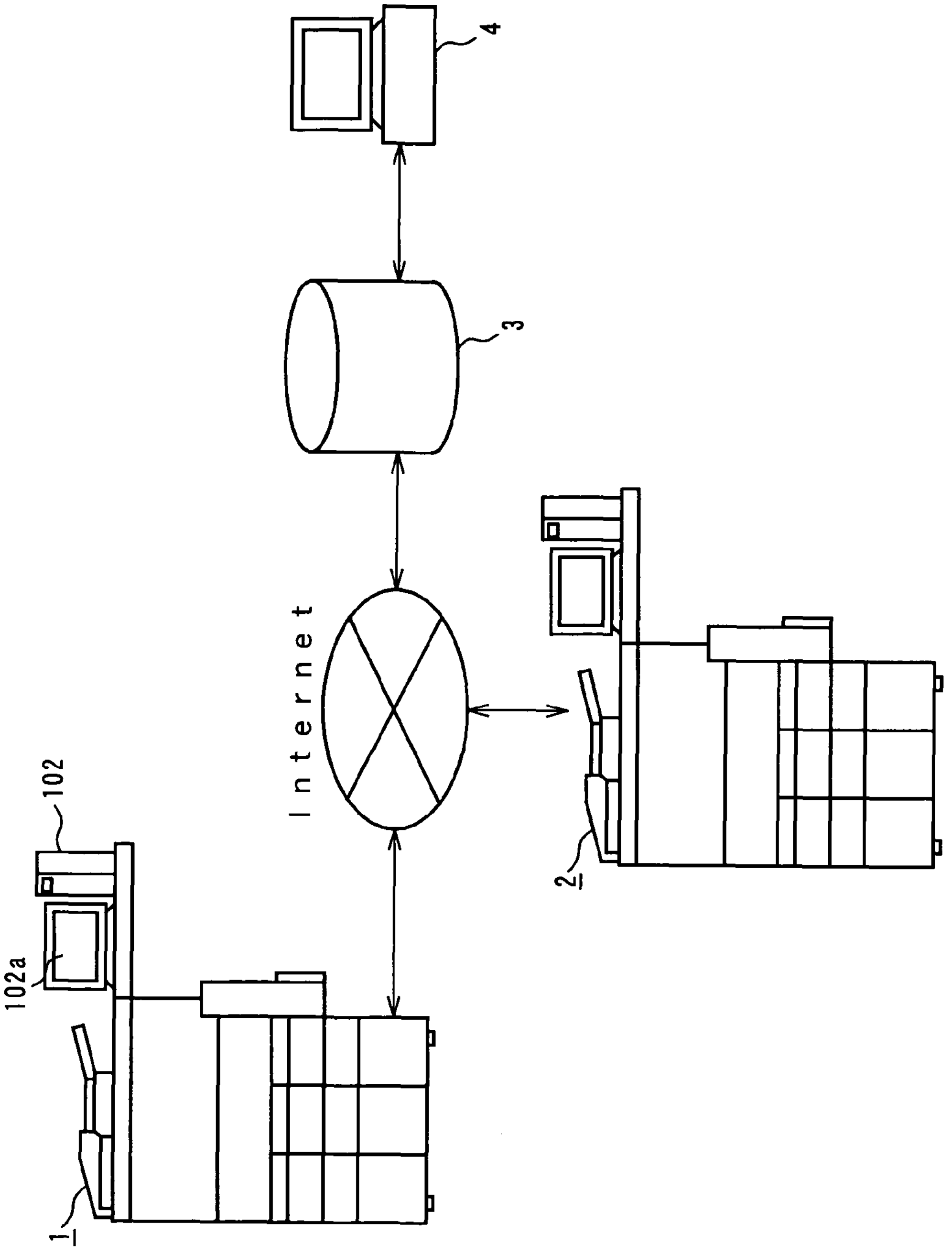
FIG. 1 is a view showing the entire configuration of a system including a multifunction terminal and an operating information estimation apparatus according to an embodiment of the present invention.

FIG. 1 is a view showing the entire configuration of a system including a multifunction terminal and an operating information estimation apparatus according to the embodiment of the present invention.

In the present embodiment, multifunction terminals 1 and 2 which is an MFP (Multi-Function Peripheral) or an MMK (Multimedia Kiosk) and a database 3 are connected to one another through the Internet (electrical communication line) in a communicable manner. Further, an operating information estimation apparatus 4 is connected to the database 3 through a LAN (Local Area Network) or the like in a communicable manner. Although two multifunction terminals are shown in FIG. 1 for the descriptive convenience, the number of the multifunction terminals to be connected is not limited. Further, the means for connecting, in a communicable manner the operating information estimation apparatus 4 and database 3 is not limited to a LAN, and they can be connected to one another through a WAN (Wide Area Network) or the Internet.

In the present embodiment, the operating information estimation apparatus 4 has a function of estimating operating information relating to an execution state of functions provided in the multifunction terminal based on information received from the multifunction terminal. The multifunction terminals 1 and 2 each has a function of transmitting predetermined information to the database 3 (that is, to the operating information estimation apparatus 4 that is connected to the database 3 and utilizes the information to be stored in the database 3). Although the database 3 and operating information estimation apparatus 4 are separately provided, the database 3 may be incorporated in the operating information estimation apparatus 4.

Figure 2:
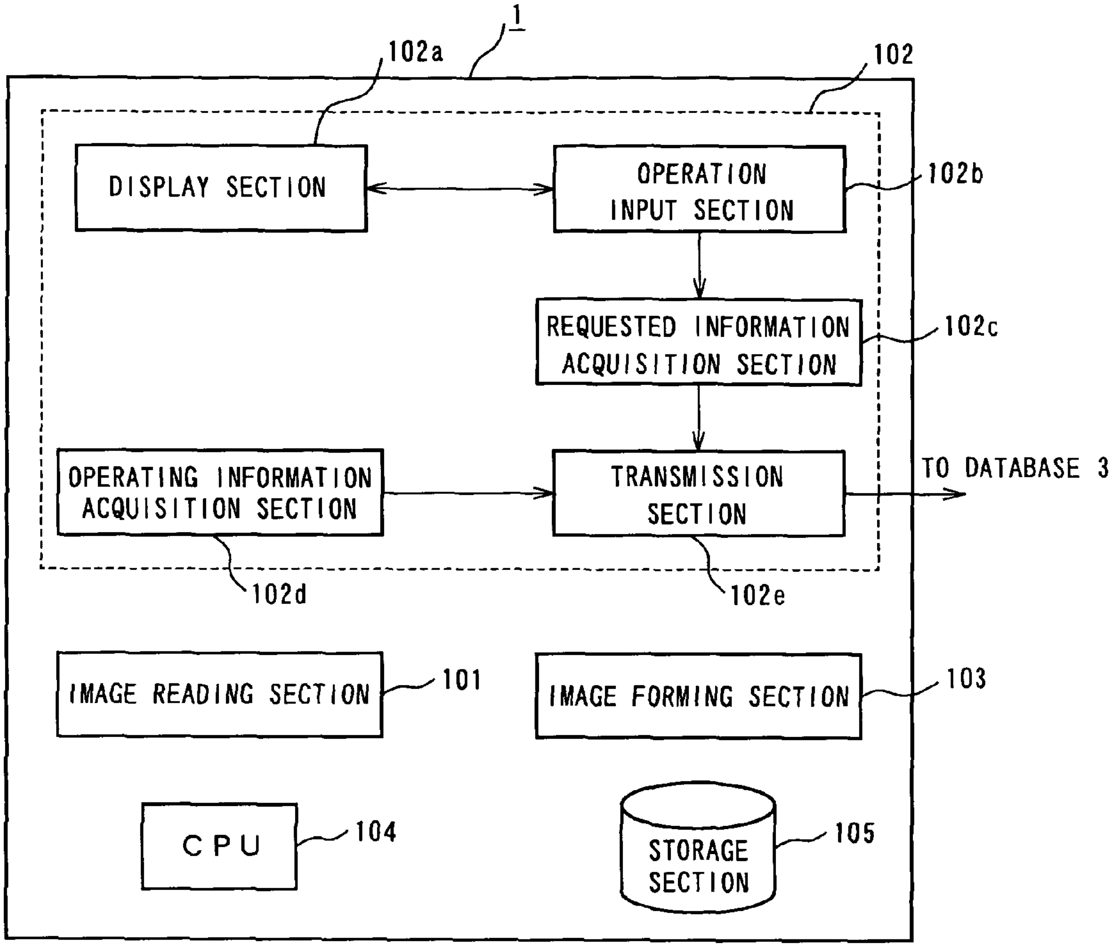
FIG. 2 is a functional block diagram showing the configuration of the multifunction terminal according to the embodiment.

FIG. 2 is a functional block diagram showing the configuration of the multifunction terminal according to the embodiment. For the descriptive convenience, it is assumed that the multifunction terminals 1 and 2 have the same configuration.

The multifunction terminal 1 includes an image reading section 101, an information transmission section 102, an image forming section 103, a CPU 104, and a storage section 105. The information transmission section 102 includes a display section 102*a*, an operation input section 102*b*, a requested information acquisition section 102*c*, an operating information acquisition section 102*d*, and a transmission section 102*e*.

The image reading section 101 serves as a scanner that reads an image on a document. The image forming section 103 has a function of forming an image on a sheet. The CPU 104 has a role of controlling the components constituting the multifunction terminal 1 and performing various computation processing. The storage section 105, which includes a RAM, a ROM, and the like, has a role of storing a program that the multifunction terminal 1 allows the CPU 104 to execute in order to perform predetermined processing.

The display section 102*a* is constituted by, for example, a liquid crystal display and has a role of displaying various information on the display of the terminal. The operation input section 102*b* is constituted by a keyboard or mouse and has a role of receiving an operation input from a user of the multifunction terminal 1. The display section 102*a* and operation input section 102*b* can be constituted by a touch panel display.

The requested information acquisition section 102*c* has a role of acquiring (requested information acquisition step) requested information relating to requirements of the user for the multifunction terminal. The requested information in this case includes at least information relating to functions that the user expects the multifunction terminal to provide.

The operating information acquisition section 102*d* has a role of acquiring previous operating information in the multifunction terminal. The operating information in this case includes the number of times of image forming processing, that of copy processing, that of image reading processing, and that of FAX transmission job performed in a previous predetermined time period in the multifunction terminal. These information are acquired from count number, CV (copy volume), and PV (print volume) counted by a not shown job counter in the multifunction terminal.

The transmission section (corresponding to requested information transmission section and operating information transmission section) 102*e* has a role of transmitting requested information acquired by the requested information acquisition section 102*c* to the operating information estimation apparatus 4 at a first predetermined timing. Further, the transmission section 102*e* has a role of transmitting operating information acquired by the operating information acquisition section 102*d* to the operating information estimation apparatus 4 at a second predetermined timing. The first and second timings may be set different from each other or set equal to each other. The transmission of these information at a predetermined processing timing reduces a processing load incurred by the information transmission. It is preferable that the information transmission processing be performed when a processing load on the multifunction terminal 1 (for example, computation load on the CPU) is less than a predetermined state.

Figure 3:
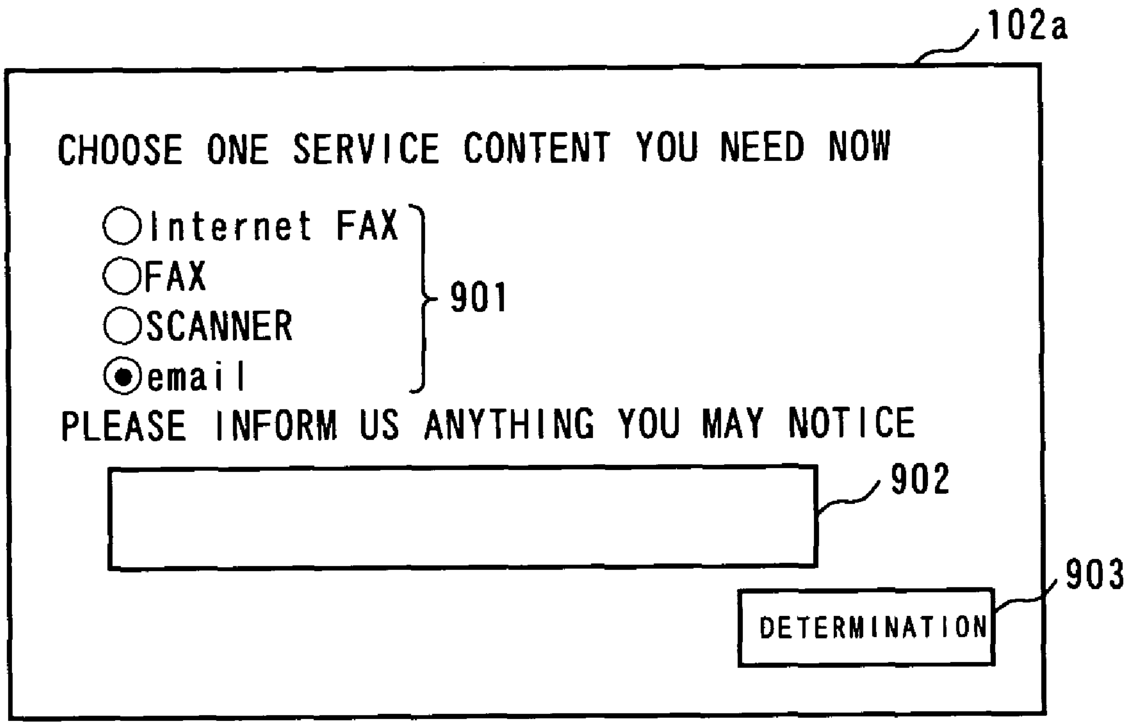
FIG. 3 is a view showing an example of the contents displayed on a display section 102*a* of the multifunction terminal according to the embodiment.

FIG. 3 is a view showing an example of the contents displayed on a display section 102*a* of the multifunction terminal according to the embodiment. Here, an entry screen for a user to input information relating to a function that the user expects the multifunction terminal 1 to provide is shown. In this drawing, a display area 901 for the user to select a desired function from Internet FAX, FAX, scanner, and E-mail as a service that the user expects the multifunction terminal to provide and a text box 902 for the user to write things that he or she has noticed or input some requests are displayed. The abovementioned "desired function" and "request" that the user writes correspond to the requested information. When the user selects a determination button 903 on the screen shown in FIG. 3, predetermined information is transmitted to the operating information estimation apparatus 4.

Figure 4:
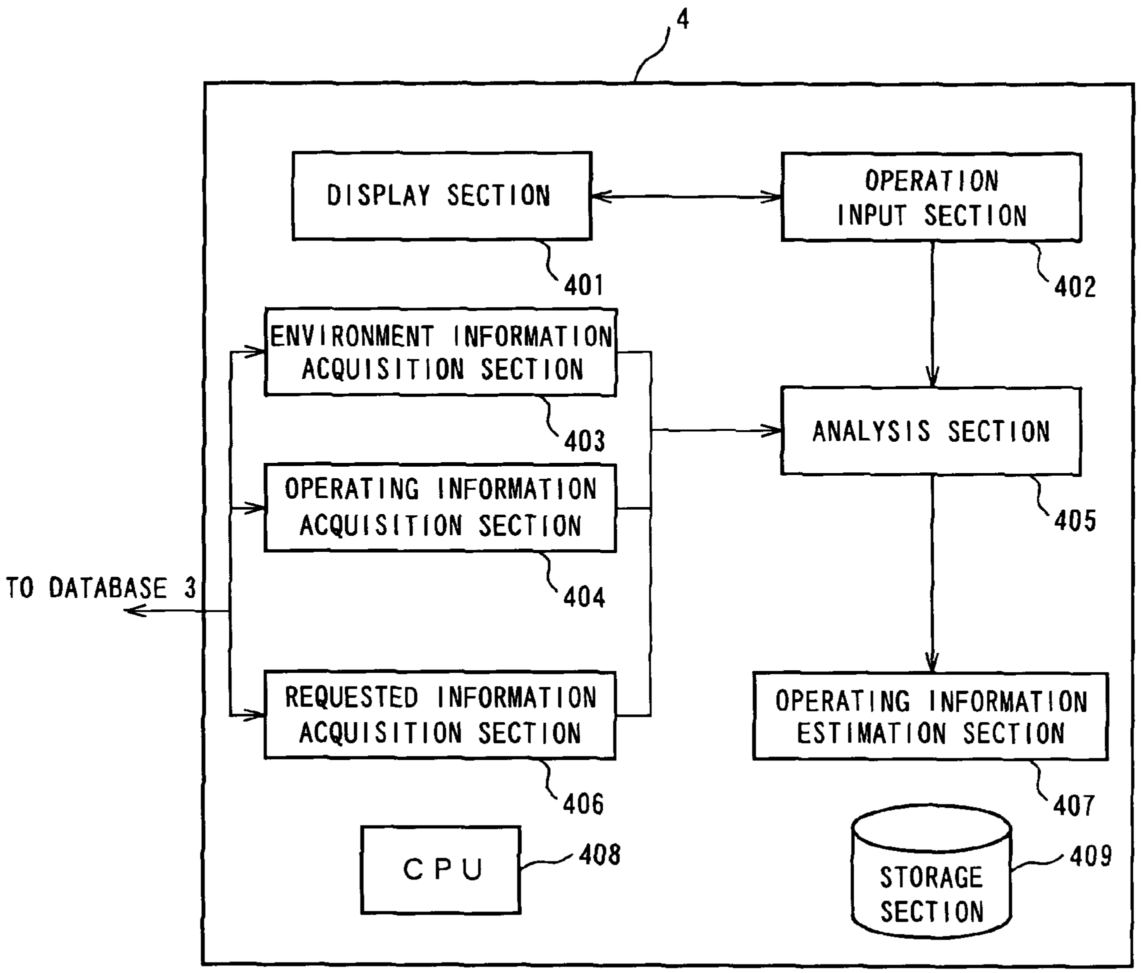
FIG. 4 is a functional block diagram showing the configuration of the operating information estimation apparatus according to the embodiment.

FIG. 4 is a functional block diagram showing the configuration of the operating information estimation apparatus 4 according to the embodiment.

The operating information estimation apparatus 4 is constituted by, for example, a PC, and includes a display section 401, an operation input section 402, an environment information acquisition section 403, an operating information acquisition section 404, an analysis section 405, a requested information acquisition section 406, an operating information estimation section 407, a CPU 408, and a storage section 409.

The display section 401 is constituted by, for example, a liquid crystal display and has a role of displaying various information on the display of the apparatus. The operation input section 402 is constituted by a keyboard or mouse and has a role of receiving an operation input from a user of the operating information estimation apparatus 4. The display section 401 and operation input section 402 can be constituted by a touch panel display or the like.

The environment information acquisition section 403 has a role of acquiring environment information relating to the installation environment of the multifunction terminal.

The operating information acquisition section 404 has a role of acquiring operating information relating to an execution state of the functions provided in the multifunction terminal.

The analysis section 405 performs regression analysis with the environment information acquired by the environment information acquisition section 403 set as an explanatory variable and the operating information acquired by the operating information acquisition section 404 set as a criterion variable. Alternatively, the analysis section 405 may perform regression analysis with the environment information acquired by the environment information acquisition section 403 set as an explanatory variable and the requested information acquired by the requested information acquisition section 406 and the operating information acquired by the operating information acquisition section 404 set as a criterion variable.

The requested information acquisition section 406 has a role of acquiring requested information (requested information acquisition step) relating to requirements of the user for the multifunction terminal.

The operating information estimation section 407 has a role of estimating operating information corresponding to given environment information based on the analysis result (regression expression, etc.) obtained by the analysis section 405. The given environment information in this case is information defined by a user's operation input received by the operation input section (the details will be described later). At the time when the analysis section 405 performs the regression analysis based on the requested information and operating information, the operating information estimation section 407 estimates operating information and requested information corresponding to given environment information based on the analysis result (regression expression, etc.) obtained by the analysis section 405.

The CPU 408 has a role of controlling the components constituting the operating information estimation apparatus 4 and performing various computation processing. The storage section 409, which includes a RAM, a ROM, and the like, has a role of storing a program and the like that the operating information estimation apparatus 4 allows the CPU 408 to execute in order to perform predetermined processing (for example, respective steps in the operating information estimation method).

The database 3 has a role of storing the above environment information (to be described later). The environment information relates to the installation environment of the multifunction terminal and previously stores information related to the multifunction terminal that has already been installed at the customer's site. The above information is newly created, changed, or deleted in the case where a new multifunction terminal is installed or the existing multifunction terminal is moved to another location.

FIG. 5 is a view showing an example of the contents of operating information and environment information (market data) stored in the database 3. As shown in FIG. 5, the environment information includes at least one of the number of specified facilities such as a business site, the number of people who are engaged in a specified occupation, such as student or the like, and the number of competing shops within a predetermined area where an multifunction terminal is installed (for example, within an area having a radius of 500 m with the center thereof set at the installation location of the multifunction terminal). In the environment information shown in FIG. 5, the number of color prints output in the image forming section per month is defined as Y, the number of user accesses to the multifunction terminal per day is defined as X1, the number of students within a predetermined area is defined as X2, the population in a predetermined area is defined as X3, the number of competing shops within a predetermined area is defined as X4, the number of business sites with 100 employees or more is defined as X5, and the number of business sites with less than 100 employees is defined as X6. In FIG. 5, Y corresponds to the operating information, and X1 to X6 correspond to the environment information.

An operating information estimation method according to the embodiment of the present invention will next be described.

Figure 6:
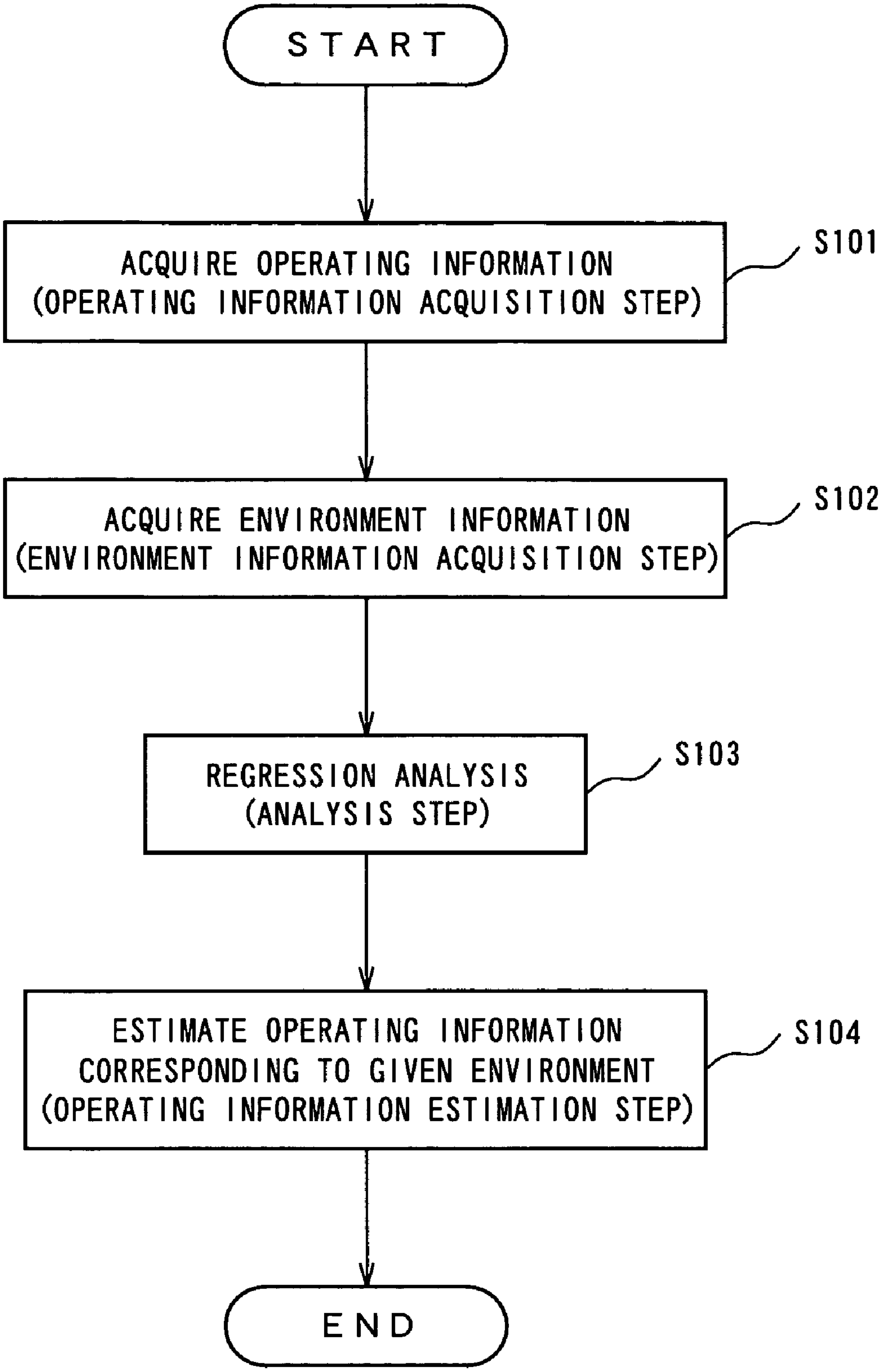
FIG. 6 is a flowchart showing a process flow of an operating information estimation method in the system including the multifunction terminal and operating information estimation apparatus according to the embodiment.

FIG. 6 is a flowchart showing a process flow of the operating information estimation method in the system including the multifunction terminal and operating information estimation apparatus according to the embodiment.

Firstly, the operating information acquisition section 102*d* of the multifunction terminal 1 acquires operating information relating to an execution state (the number of times of processing, number of times of printing, and number of times of reading and so on) of functions provided in the multifunction terminal1 (printer function, scanner function, copy function, FAX function and so on) (operating information acquisition step) (S101).

Further, the environment information acquisition section 403 of the operating information estimation apparatus 4 acquires environment information relating to the installation environment of the multifunction terminal (environment information acquisition step) (S102). Either the environment information acquisition step or the above operating information acquisition step can be performed first as long as the both operating information and environment information can be acquired.

Next, the analysis section 405 of the operating information estimation apparatus 4 performs multiple regression analysis (analysis step) (S103) with the environment information acquired in the environment information acquisition step (S102) set as an explanatory variable and the operating information acquired in the operating information acquisition step (S101) set as a criterion variable.

In the case where the multiple regression analysis in the analysis section 405 is based on the environment information, operating information, and requested information (requested information acquired in the requested information acquisition step) shown in FIG. 5, the environment information relating to the environment where the multifunction terminal is installed are set as explanatory variables X1 to X6, and the operating information or requested information representing the execution state in the multifunction terminal are set as a variable Y. When the multiple regression analysis is performed in this manner, the following regression expression can be obtained. Note that it is preferable to adequately set the explanatory variable based on the contribution ratio in order to improve reliability of the regression expression.

$$Y=a1X1+a2X2+a3X3+a4X4+a5X5+a6X6+b$$

a1 to a6: regression coefficients b: constant number

The operating information estimation section 407 then estimates operating information and requested information corresponding to given environment information based on the analysis result (regression expression) obtained from the analysis (analysis step) performed by the analysis section 405 (analysis information estimation step) (S104). The given environment information in this case is based on an operation input from a user through the operation input section 402 of the operating information estimation apparatus 4.

Figure 7:
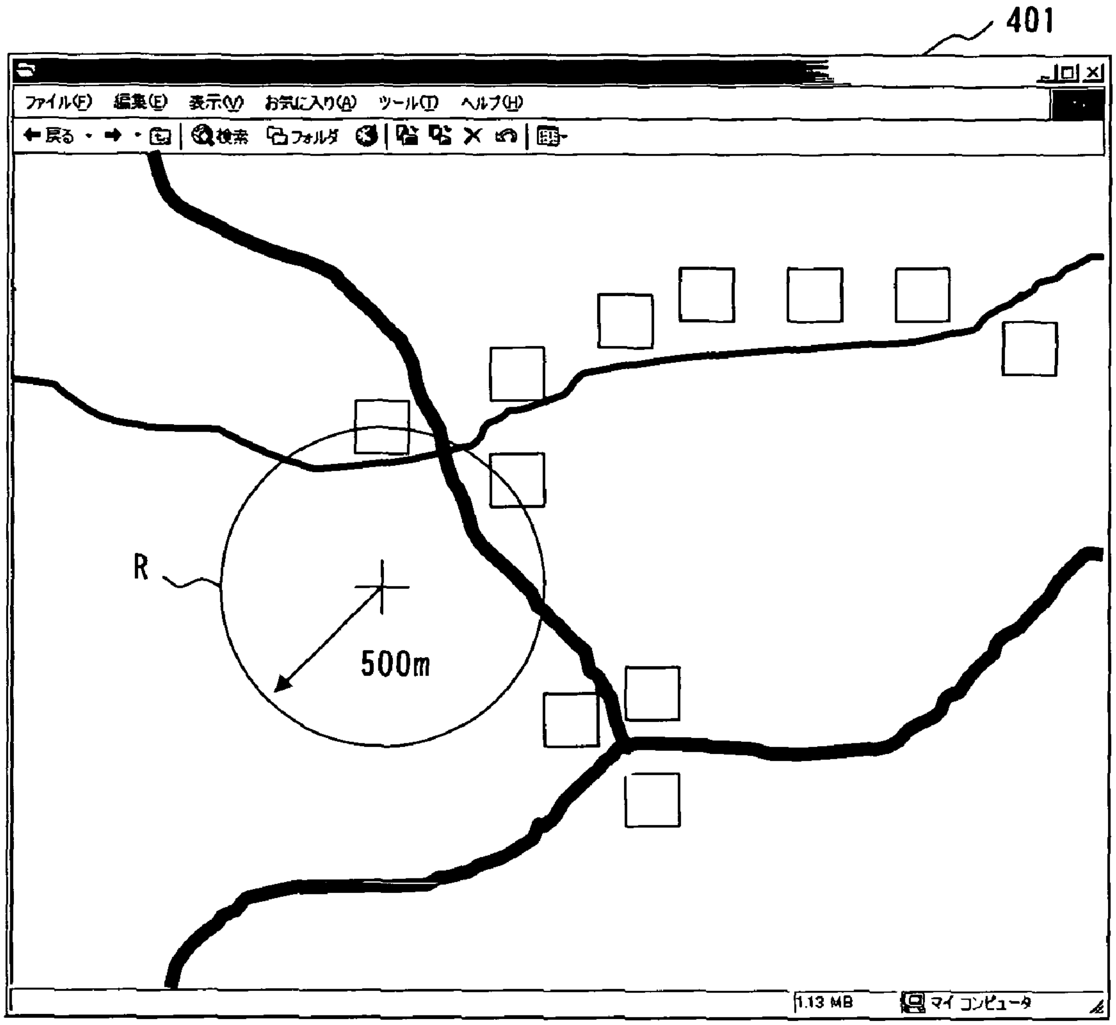
FIG. 7 is a view for explaining a method of setting given environment information.
Figures 8, 9, 10:
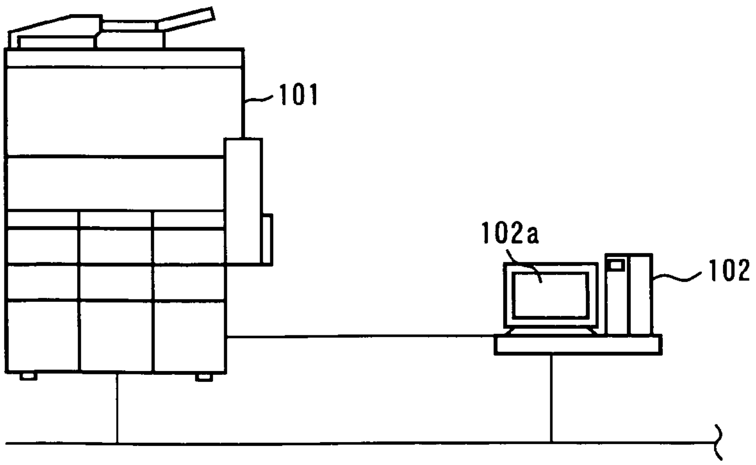
FIG. 8 is a view showing an example of given environment information.
FIG. 9 is an example of a predicted value of the operating information corresponding to given environment information which is obtained as a result of the estimation made by an operating information estimation section.
FIG. 10 is a view for explaining another configuration of the system, in which the multifunction terminal and an information transmission section are separately provided.

As shown in FIG. 7, the display section 401 of the operating information estimation apparatus 4 is used to display map information and the operation input section 402 is used to select an arbitrary position. Then the environment information of an area R having a radius of 500 m and centered on the arbitrary position is set as the given environment information. Alternatively, the user can directly input the given environment information through a keyboard or the like of the operation input section 402. FIG. 8 is a view showing an example of the given environment information.

FIG. 9 is an example of predicted values of the operating information and requested information corresponding to given environment information, which are obtained as a result of the estimation made by the operating information estimation section 407. In FIG. 9, count numbers in the respective functions represent count numbers per month. Based on the estimation result, functions that the user expects the multifunction terminal to provide can be estimated.

When the CPU (computer) 408 executes an operating information estimation program stored in the storage section 409, the respective steps (S101 to S104) of the operating information estimation method in the embodiment are realized.

In the above embodiment, the function that realizes the invention is previously stored in the interior of the apparatus. Alternatively, however, the same function may be downloaded from a network to the apparatus or may be installed from a recording medium that stores the same function. In this case, any recording medium, such as a CD-ROM, can be used as long as it can store a program and it is readable by the apparatus. The function previously obtained by the download or installation may works in collaboration with an OS (Operating System) or the like in the apparatus.

Further, in the above embodiment, the information transmission section 102 is incorporated in the multifunction terminal 1. Alternatively, however, as shown in FIG. 10, the multifunction terminal 1 and information transmission section 102 may be separately provided as far as they are connected to each other in a communicable manner such that the requested information acquisition section 102*c* and operating information acquisition section 102*d* of the information transmission section 102 can acquire the requested information and operating information of the multifunction terminal 1. In the case where the information transmission section 102 is separately provided as described above, it may be constituted by a PC or the like. In this case, it is preferable that the PC constituting the information transmission section 102 have a display for the user to view various information, a keyboard or mouse for the user to perform an operation input, and functions of reading and writing from/in a storage medium such as a flexible disk, a compact disk, or a memory card. With the PC having the above configuration, it is possible for the user to control image forming processing, image reading processing, copy processing, FAX transmission processing and the like in the multifunction terminal 1.

Further, according to the present embodiment, it is possible to allow the operating information estimation apparatus 4 to estimate the operating information corresponding to given environment information for a certain multifunction terminal, and allow functions (mail function, scanner function, Internet browsing function, etc.) that can realize the contents of the estimated operating information to be installed on the multifunction terminal as a program by means of download.

With the above configuration, in the case where a multifunction terminal is installed at a new location or where a new function is added to the existing multifunction terminal, it is possible to estimate how often the newly added function is utilized at the new installation location. Further, it is possible to add a function with a specification suitable for the new installation location based on the estimation result. Further, the adequate addition of function to the multifunction terminal or adequate installation of a new multifunction terminal that meets the user's needs results in contribution to cost reduction.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

As described above in detail, according to the present invention, it is possible to provide a technique for estimating functions that user expects a multifunction terminal at some installation location to provide.

It is claimed:

1. A multifunction terminal that transmits predetermined information to an operating information estimation apparatus, wherein the operating information estimation apparatus estimates operating information relating to an execution state of functions provided in the multifunction terminal based on the predetermined information, the multifunction terminal comprising:

the operating information estimation apparatus including an environment information acquisition section that acquires environment information relating to an installation location of the multifunction terminal, the environment information including at least one of the number of specified facilities, the number of people who are engaged in a specified occupation, and the number of competing shops within a predetermined area where the multifunction terminal is installed, an operating information acquisition section that acquires operating information relating to an execution state of functions provided in the multifunction terminal, an analysis section that performs regression analysis with the environment information acquired by the environment information acquisition section set as an explanatory variable and the operating information acquired by the operating information acquisition section set as a criterion variable, and an operating information estimation section that estimates the operating information corresponding to given environment information based on a result of the analysis made by the analysis section;

a requested information acquisition section that acquires requested information relating to requirements of a user for the multifunction terminal; and a requested information transmission section that transmits the requested information acquired by the requested information acquisition section to the operating information estimation apparatus at a first predetermined timing, wherein the requested information includes at least information relating to functions that the user expects the multifunction terminal to provide.

2. The multifunction terminal according to claim 1, comprising:

an operating information acquisition section that acquires previous operating information of the multifunction terminal; and an operating information transmission section that transmits the operating information acquired by the operation information acquisition section to the operating information estimation apparatus at a second predetermined timing.

3. The multifunction terminal according to claim 1, wherein the operating information includes at least one of the number of times of image forming processing, that of copy processing, that of image reading processing, and that of FAX transmission processing performed in a previous predetermined time period in the multifunction terminal.

4. An operating information estimation apparatus comprising:

an environment information acquisition section that acquires environment information relating to an installation location of a multifunction terminal, the environment information including at least one of the number of specified facilities, the number of people who are engaged in a specified occupation, and the number of competing shops within a predetermined area where the multifunction terminal is installed;

an operating information acquisition section that acquires operating information relating to an execution state of functions provided in the multifunction terminal;

an analysis section that performs regression analysis with the environment information acquired by the environment information acquisition section set as an explanatory variable and the operating information acquired by the operating information acquisition section set as a criterion variable;

an operating information estimation section that estimates the operating information corresponding to given environment information based on a result of the analysis made by the analysis section; and a requested information acquisition section that acquires requested information relating to requirements of a user for the multifunction terminal, the analysis section performing regression analysis with the environment information acquired by the environment information acquisition section set as an explanatory variable and the requested information acquired by the requested information acquisition section and the operating information acquired by the operating information acquisition section set as a criterion variable, and the operation information estimation section estimating the operating information and requested information corresponding to given environment information based on a result of the analysis made by the analysis section.

5. The operating information estimation apparatus according to claim 4, wherein the requested information includes at least information relating to functions that the user expects the multifunction terminal to provide.

6. An operating information estimation method comprising:

an operating information acquisition step that acquires operating information relating to an execution state of functions provided in a multifunction terminal, the environment information includes at least one of the number of specified facilities, the number of people who are engaged in a specified occupation, and the number of competing shops within a predetermined area where the multifunction terminal is installed;

an environment information acquisition step that acquires environment information relating to an installation location of the multifunction terminal; an analysis step that performs regression analysis with the environment information acquired in the environment information acquisition step set as an explanatory variable and the operating information acquired in the operating information acquisition step set as a criterion variable;

an operating information estimation step that estimates the operating information corresponding to given environment information based on a result of the analysis made by the analysis section; and a requested information acquisition step that acquires requested information relating to requirements of a user for the multifunction terminal, the analysis step performing regression analysis with the environment information acquired in the environment information acquisition step set as an explanatory variable and the requested information acquired in the requested information acquisition step and the operating information acquired in the operating information acquisition step set as a criterion variable, and the operation information estimation step estimating the operating information and requested information corresponding to given environment information based on a result of the analysis made by the analysis step.

7. The operating information estimation method according to claim 6, wherein the requested information includes at least information relating to functions that the user expects the multifunction terminal to provide.

* * * * *